(12) United States Patent
Hiroshi

(10) Patent No.: US 7,193,675 B2
(45) Date of Patent: *Mar. 20, 2007

(54) LIQUID CRYSTAL DISPLAY DEVICE

(75) Inventor: Komatsu Hiroshi, Kumi-shi (KR)

(73) Assignee: LG. Philips LCD Co., Ltd, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/918,703

(22) Filed: Aug. 16, 2004

(65) Prior Publication Data

US 2005/0078255 A1   Apr. 14, 2005

Related U.S. Application Data

(60) Division of application No. 10/267,787, filed on Oct. 10, 2002, now Pat. No. 6,778,245, which is a continuation of application No. 08/880,068, filed on Jun. 20, 1997, now Pat. No. 6,608,662.

(30) Foreign Application Priority Data

Jun. 22, 1996  (KR) .................................. 96-23115

(51) Int. Cl.
G02F 1/1343  (2006.01)
G02F 1/1337  (2006.01)
G02F 1/1368  (2006.01)

(52) U.S. Cl. ...................... 349/141; 349/128; 349/119; 349/177

(58) Field of Classification Search ................ 349/119, 349/128, 132, 141, 177, 181, 123, 96, 117
See application file for complete search history.

(56) References Cited

U.S. PATENT DOCUMENTS 4,239,346 A   12/1980   Lloyd 4,726,659 A   2/1988   Conrad et al.
5,307,189 A   4/1994   Nishiki et al.
5,321,535 A   6/1994   Ukai et al.
5,459,596 A   10/1995   Ueda et al.

(Continued)

FOREIGN PATENT DOCUMENTS

EP   0 368 260   5/1990

(Continued)

OTHER PUBLICATIONS

R. Kiefer, et al., *In Plane Switching of Nematic Liquid Crystals*, Japan Display '92, pp. 547-550.

(Continued)

*Primary Examiner*—Toan Ton
*Assistant Examiner*—Tai Duong
(74) *Attorney, Agent, or Firm*—McKenna Long & Aldridge LLP

(57) ABSTRACT

A liquid crystal display device includes first and second substrates, a plurality of gate bus lines and data bus lines on the first substrate, the gate bus lines being perpendicular to the data bus lines, a plurality of pixels defined by the gate bus lines and the data bus lines, the pixels having a plurarity of regions, at least a pair of electrodes in each region having a common direction, and a plurality of liquid crystal molecules between the substrates.

27 Claims, 16 Drawing Sheets

U.S. PATENT DOCUMENTS

| | | | |
|---|---|---|---|
| 5,464,669 | A | 11/1995 | Kang et al. |
| 5,492,762 | A | 2/1996 | Hirai et al. |
| 5,540,784 | A | 7/1996 | Ranes |
| 5,576,858 | A | 11/1996 | Ukai et al. |
| 5,598,285 | A | 1/1997 | Kondo et al. |
| 5,600,464 | A | 2/1997 | Ohe et al. |
| 5,608,556 | A | 3/1997 | Koma |
| 5,646,705 | A | 7/1997 | Higuchi et al. |
| 5,686,019 | A | 11/1997 | Nakamura |
| 5,737,051 | A | 4/1998 | Kondo et al. |
| 5,742,369 | A | 4/1998 | Mihara et al. |
| 5,745,207 | A | 4/1998 | Asada et al. |
| 5,757,455 | A | 5/1998 | Sugiyama et al. |
| 5,760,856 | A | 6/1998 | Yanagawa et al. |
| 5,760,857 | A | 6/1998 | Yanagawa et al. |
| 5,786,876 | A | 7/1998 | Ota et al. |
| 5,793,459 | A | 8/1998 | Toko |
| 5,818,560 | A | 10/1998 | Kouno et al. |
| 5,831,701 | A | 11/1998 | Matsuyama et al. |
| 5,841,499 | A | 11/1998 | Baur et al. |
| 5,852,485 | A | 12/1998 | Shimada et al. |
| 5,859,682 | A | 1/1999 | Kim et al. |
| 5,870,160 | A | 2/1999 | Yanagawa et al. |
| 5,886,762 | A | 3/1999 | Lee et al. |
| 5,905,556 | A | 5/1999 | Suzuki et al. |
| 5,907,380 | A | 5/1999 | Lien |
| 5,910,271 | A | 6/1999 | Ohe et al. |
| 5,914,762 | A | 6/1999 | Lee et al. |
| 5,946,060 | A | 8/1999 | Nishiki et al. |
| 5,946,066 | A | 8/1999 | Lee et al. |
| 5,946,067 | A | 8/1999 | Kim et al. |
| 5,956,111 | A | 9/1999 | Ohta et al. |
| 5,959,708 | A | 9/1999 | Lee et al. |
| 5,969,782 | A | 10/1999 | Lee et al. |
| 5,977,562 | A | 11/1999 | Hirakata et al. |
| 5,981,261 | A | 11/1999 | Mollet et al. |
| 5,995,186 | A | 11/1999 | Hiroshi |
| 6,005,650 | A | 12/1999 | Kim et al. |
| 6,040,887 | A | 3/2000 | Matsuyama et al. |
| 6,091,493 | A | 7/2000 | Stover et al. |
| 6,266,116 | B1 | 7/2001 | Ohta et al. |
| 6,288,763 | B1 | 9/2001 | Hirota |

FOREIGN PATENT DOCUMENTS

| | | |
|---|---|---|
| EP | 0 588 568 | 3/1994 |
| EP | 0 749 029 | 12/1996 |
| JP | 60-098536 | 6/1985 |
| JP | 60-158421 | 8/1985 |
| JP | 62-78532 | 4/1987 |
| JP | 04-067127 | 3/1992 |
| JP | 06-273803 | 9/1994 |
| JP | 07-013439 | 1/1995 |
| JP | 7-36058 | 2/1995 |
| JP | 07-225388 | 8/1995 |
| JP | 7-225538 | 8/1995 |
| JP | 08-062586 | 3/1996 |
| JP | 09-005763 | 1/1997 |
| JP | 09-005793 | 1/1997 |
| JP | 09-005964 | 1/1997 |
| JP | 09-033946 | 2/1997 |
| JP | 09-043589 | 2/1997 |
| JP | 09-043590 | 2/1997 |
| JP | 09-101538 | 4/1997 |
| JP | 09-105908 | 4/1997 |
| JP | 09-105918 | 4/1997 |
| JP | 09-258269 | 10/1997 |
| JP | 09-325346 | 12/1997 |
| JP | 10-319436 | 12/1998 |
| KR | 96-32049 | 9/1996 |
| KR | 97-22458 | 5/1997 |
| KR | 98-083765 | 12/1998 |
| WO | 97/10530 | 3/1997 |

OTHER PUBLICATIONS

M. Oh-e, et al., *Principles and Characteristics of Electro-Optical Behaviour with In-Plane Switching Mode*, Asia Display '95, pp. 577-580.

M. Ohta, et al., *Development of Super-TFT-LCDs with In-Plane Switching Display Mode*, Asia Display '95, pp. 707-710.

S. Matsumoto, *Display Characteristics of In-Plane-Switching (IPS) LCDs and a Wide-Viewing-Angle 14.5in. IPS TFT-LCD*, Euro Display '96, pp. 445-448.

H. Wakemoto, et al., *An Advanced In Plane-Switching Mode TFT-LCD*, SID 97 Digest, pp. 929-932.

Japanese Abstract for JP09-269507, Oct. 14, 1997.

S.H. Lee, et al., *High-Transmittance, Wide-Viewing-Angle Nematic Liquid Crystal Display Controlled by Fringe-Field Switching*, Asia Display '98, pp. 371-374.

U.S. Appl. No. 09/365,634, filed Aug. 1999, Hiroshi.
U.S. Appl. No. 08/880,068, filed Jun. 1997, Hiroshi.
U.S. Appl. No. 09/143,624, filed Aug. 1998, Shin et al.
U.S. Appl. No. 09/079,894, filed May 1998, Seo.
U.S. Appl. No. 09/613,730, filed Jul. 2000, Hiroshi.
U.S. Appl. No. 09/079,895, filed May 1998, Oh.
U.S. Appl. No. 09/348,704, filed Jul. 1999, Lee et al.
U.S. Appl. No. 09/134,405, filed Aug. 1998, Ham.
U.S. Appl. No. 09/149,746, filed Sep. 1998, Seo.
U.S. Appl. No. 09/235,205, filed Jan. 1999, Seo et al.
U.S. Appl. No. 09/271,153, filed Mar. 1999, Son et al.

LIQUID CRYSTAL DISPLAY DEVICE

This application is a divisional of prior application Ser. No. 10/267,787, filed Oct. 10, 2002 now U.S. Pat. No 6,778,245; which is a continuation of prior application Ser. No. 08/880,068, filed Jun. 20, 1997 now U.S. Pat. No. 6,608,662.

This application claims the benefit of Korean application No. 1996-23115 filed on Jun. 22, 1996, which is hereby incorporated by reference.

BACKGROUND OF INVENTION

1. Field of the Invention

The present invention relates to a liquid crystal display device, and more particularly, to an in-plane switching mode liquid crystal display device (LCD). Although the present invention is suitable for a wide scope of applications, it is particularly suitable for improving the quality of picture image.

2. Discussion of the Related Art

As a thin film transistor liquid crystal display device (TFT-LCD) has been widely used for portable televisions or notebook computers, an LCD having a large panel is in great demand. A conventional TFT-LCD, however, has a problem that a contrast ratio is changed with a direction of viewing-angle. Liquid crystal display devices such as a twisted nematic LCD having an optical compensator and a multi-domain LCD have been proposed to cope with this problem. Nevertheless, such LCDs are not capable of solving the problem in a variation of the contrast ratio and color shifting.

An in-plane switching mode LCD to realize a wide viewing angle has also been proposed in the JAPAN DISPLAY 92 Page 457, Japanese Patent Unexamined Publication No. 7-36058, Japanese Patent Unexamined Publication No. 7-225538, and ASIA DISPLAY 95 Page 707.

A conventional in-plane switching mode LCD will now be explained with reference to FIGS. 1 to 3.

Referring first to FIGS. 1 and 2, operation of the conventional LCD will be described as follows. Liquid crystal molecules 8 in a liquid crystal layer 12 are aligned to have a rubbing direction $(\theta_R)$ of $90°<\theta_R<180°$ with respect to a longitudinal elongation direction($0°$) of a gate bus line on a substrate as shown in FIG. 2. A polarization axis direction $(\theta_{PL2})$ of a analyzer 10 attached on a second substrate 5 is parallel to the rubbing direction $(\theta_R)$. A polarization axis direction$(\theta_{PL1})$ of a polarizer 9 attached on the first substrate 1 is perpendicular to a polarization axis direction $(\theta_{PL2})$ and electrode elongation directions $(\theta_{EL})$ of a data electrode 2 and a common electrode 3 are $\theta_{EL}=90°$ with respect to the longitudinal elongation direction of the gate bus line. Thus, when a voltage is not applied to a data electrode 2 and a common electrode 3 as shown in FIG. 1A, the liquid crystal molecules 8 are aligned with a slightly tilted direction relative to the elongation direction($\theta_{EL}$) of the data and common electrodes along with the rubbing direction($\theta_R$) in the substrate. The elongation direction($\theta_{EL}$) of the electrodes is perpendicular to the longitudinal direction of the gate bus line. Conversely, when a voltage having a horizontal electric field parallel to the longitudinal direction of the gate bus line is applied to the liquid crystal layer 12 as shown in FIG. 1E, the liquid crystal molecules 8 near the first substrate are rotated and a transmittance of the liquid crystal layer 12 is changed by a birefringence. A retardation value ($\Delta$nd) of the liquid crystal layer 12 is about $\lambda/2$ (for example, $\Delta$nd would be approximately 0.21–0.36 µm, where $\lambda$ is a wavelength of an incident light). For example, when the liquid crystal rotation angle is about 45 degree, the transmittance is maximum so that a screen of the LCD becomes a black mode.

FIG. 3A is a plane view of the conventional in-plane switching mode liquid crystal display device and FIG. 3B is a cross-sectional view taken along the line A-A' in FIG. 3A. The liquid crystal display device is protected by a metal frame 22 excluding a representing unit 21 of a liquid crystal panel 32. A gate driving circuit 23, a data driving circuit 24, and a back light housing 25 including a back light 31 are mounted on the metal frame 22. In the representing unit 21, an exposure plate 75 (shown in FIG. 3B) having a light diffusion plate, polarizer 63, first and second substrates 27 and 26 constituting the liquid crystal panel 32, and an analyzer 64 are disposed on the second substrate 26. Further, a light compensator (not shown) may be disposed between the polarizer 63 and the first substrate 27 or between the second substrate 26 and the analyzer 64 to improve the contrast ratio.

Generally, in the conventional TFT-LCD, the TFT is formed in the first substrate 27 as a switching device and the color filter is formed on the second substrate 26. However, a diode may be used as a switching device in a diode LCD and a simple matrix LCD. Alternatively, when the TFT is formed on the second substrate, the color filter is formed onto the first substrate. Further, a mono-chromiumatic LCD may also be used without the color filter.

However, the conventional in-plane switching mode liquid crystal display device has a problem of the color shifting with the change of viewing angle direction. As shown in FIGS. 1C to 1D, when a horizontal electric field is applied to the electrodes 2, 3, the liquid crystal molecules 8 nearby the first substrate 1 are aligned parallel to the longitudinal direction of the gate bus line, whereas the liquid crystal molecules 8 nearby the second substrate 5 are aligned with an angle of 90°–180° relative to the longitudinal direction of the gate bus line. The liquid crystal molecules 8 are thus twisted. Therefore, color shifting is caused in either blue or yellow in a X or Y viewing angle direction, respectively. This color shifting mainly deteriorates the quality of the picture image.

SUMMARY OF INVENTION

Accordingly, the present invention is directed to a liquid crystal display device that substantially obviates one or more of the problems due to limitations and disadvantages of the related art.

An object of the present invention is to provide an in-plane switching mode liquid crystal display device having an improved picture image quality by preventing color shifting.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes a substrate, a gate bus line and a data bus line elongating horizontally and vertically to form a matrix figure, a pixel which is divided into several regions defined by the gate bus line and the data bus line, a data electrode and a common electrode in each region of the pixel, and alignment layer over the substrate.

In another aspect of the present invention, a liquid crystal display device includes first and second substrates, a plurality of gate bus lines and data bus lines on the first substrate, the gate bus lines being perpendicular to the data bus lines, a plurality of pixels defined by the gate bus lines and the data bus lines, the pixels having a plurality of regions, at least a pair of electrodes in each region having a common direction, and a plurality of liquid crystal molecules between the substrates.

In another aspect of the present invention, a liquid crystal display device includes first and second substrates, a plurality of gate bus lines and data bus lines on the first substrate in a matrix form, a plurality of pixels defined by the gate bus lines and the data bus lines, the pixels having first and second regions, at least one common bus line at each pixel, the common bus line being parallel to the gate bus line, at least a pair of first and second electrodes in the first and second regions, respectively, the first and second electrodes having first and second electrode elongation directions ($\theta_{EL1}$ and $\theta_{EL2}$) with respect to a longitudinal direction of the common bus line, a color filter layer over the second substrate, first and second alignment layers over the first and second substrates, the first and second alignment layers having first and second alignment directions ($\theta_{R1}$ and $\theta_{R2}$), respectively, a liquid crystal layer between the first substrate and the second substrate, a polarizer and a analyzer attached to the first substrate and the second substrate, respectively.

In another aspect of the present invention, A liquid crystal display device having a plurality of pixels each including a plurality of regions, the device includes first and second substrates, a liquid crystal molecular layer having liquid crystal molecules between the first and second substrates, a plurality of electrodes in each region of the pixels, an electric field parallel to the substrates applying to the electrodes, and first and second alignment layers over the first and second substrates, respectively, the first and second alignment layers having first and second alignment directions of $\theta 1$ and $\theta 2$ relative to an electrode elongating direction.

In a further aspect of the present invention, a liquid crystal display device having a plurality of pixels each including a plurality of regions, the device includes first and second substrates, a liquid crystal molecular layer having liquid crystal molecules between the first and second substrates, a plurality of electrodes on the first substrate in each region of the pixels, an electric field parallel to the substrates applying to the electrodes, a different electric field from that of a neighboring region to rotate the liquid crystal molecules in opposite directions in each neighboring region applying to the electrodes in each region, and first and second alignment layers over the first and second substrates, the first and second alignment layers providing for first and second alignment directions of $\theta_1$ and $\theta_2$.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Reference will now be made in detail to the preferred embodiments of the present invention, examples of which are illustrated in the accompanying drawings.

Hereinafter, an in-plane switching mode liquid crystal display device according to a first embodiment of the present invention will be described with reference to FIGS. 4 to 9.

Figure 1A:
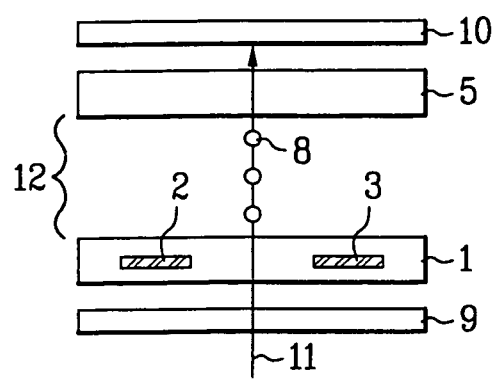
FIGS. 1A to 1D are schematic views illustrating an operation of a conventional in-plane switching mode liquid crystal display device.
Figure 1C:
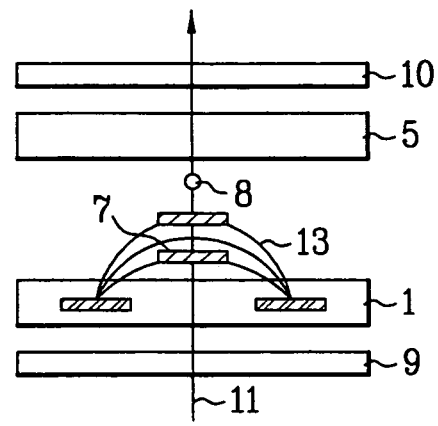
Figure 1B:
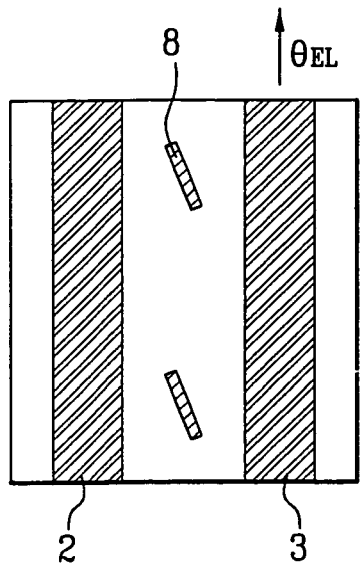
Figure 1D:
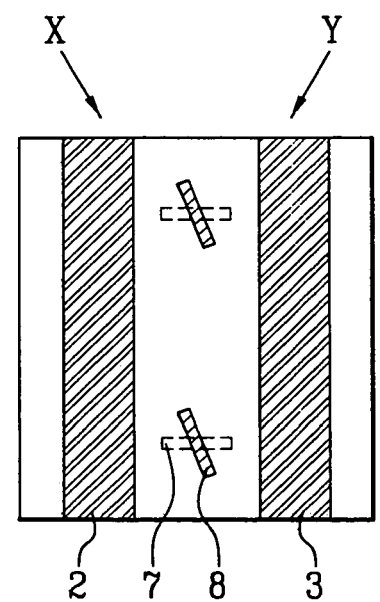
Figure 2:
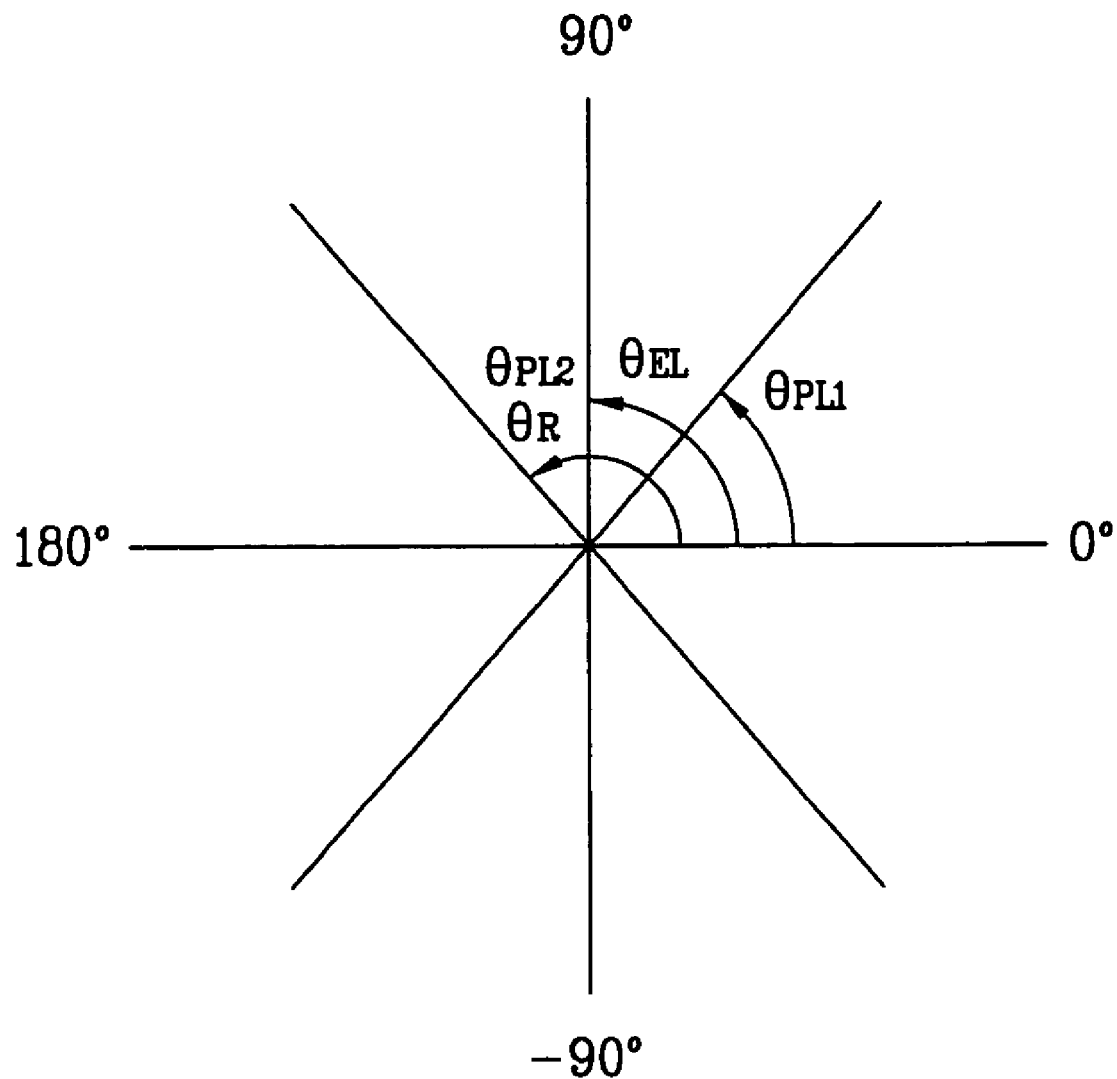
FIG. 2 illustrates an axis directional relationship in the conventional in-plane switching mode liquid crystal display device.
Figure 3A:
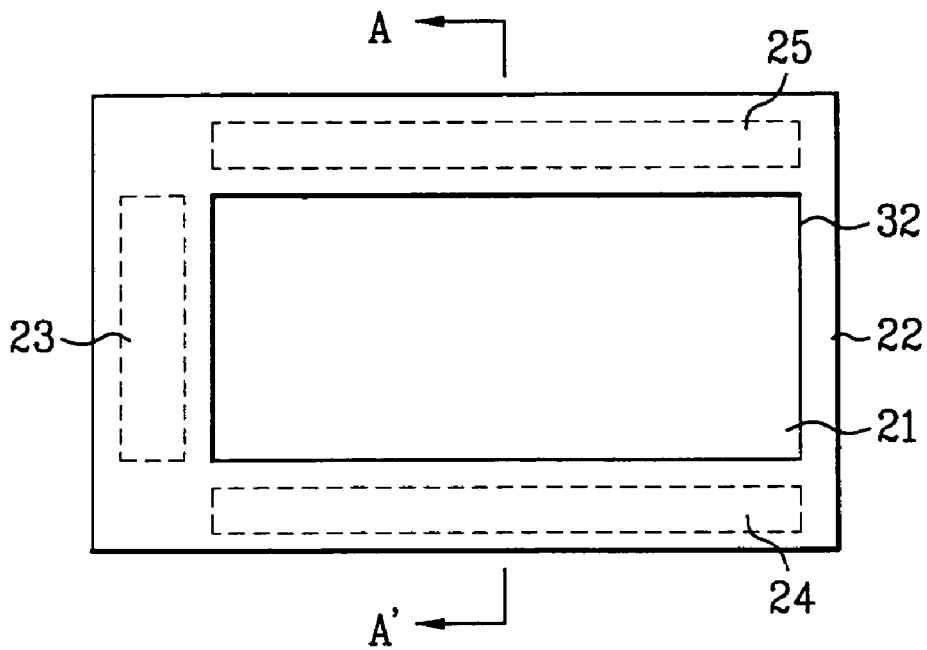
FIG. 3A illustrates the conventional in-plane switching mode liquid crystal display device.
Figure 3B:
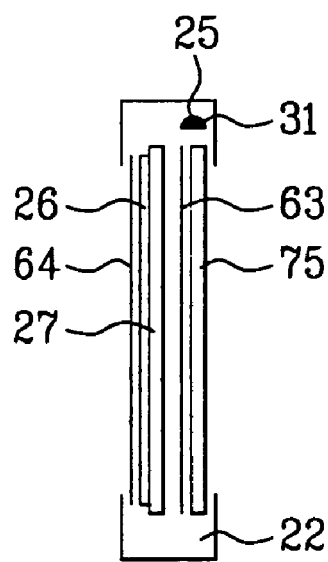
FIG. 3B is a cross-sectional view of the conventional in plane switching mode liquid crystal display device taken along the line A-A' in FIG. 3A.
Figure 4:
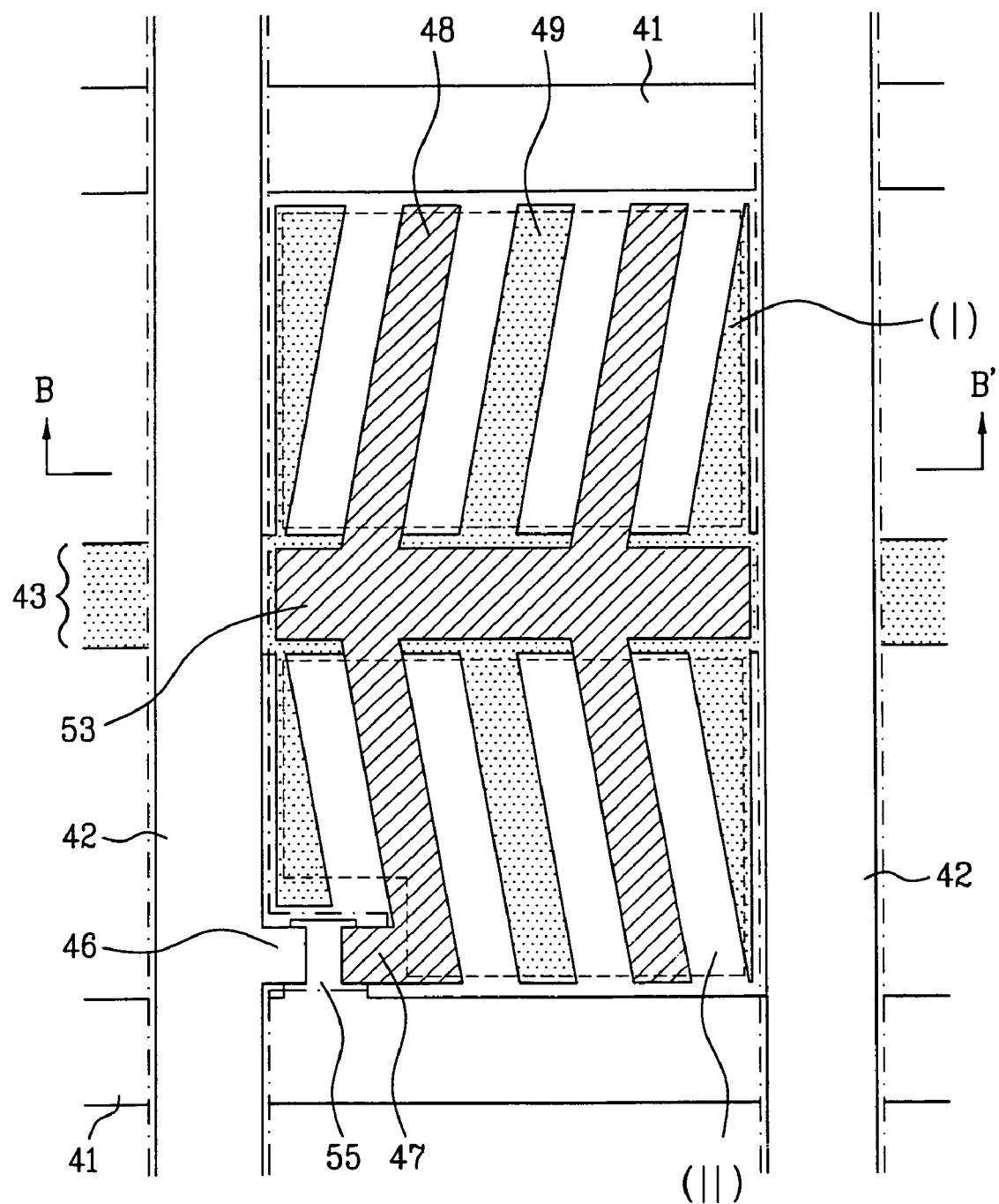
FIG. 4 is a plane view of a liquid crystal display device in accordance with a first embodiment of the present invention.
Figure 5:
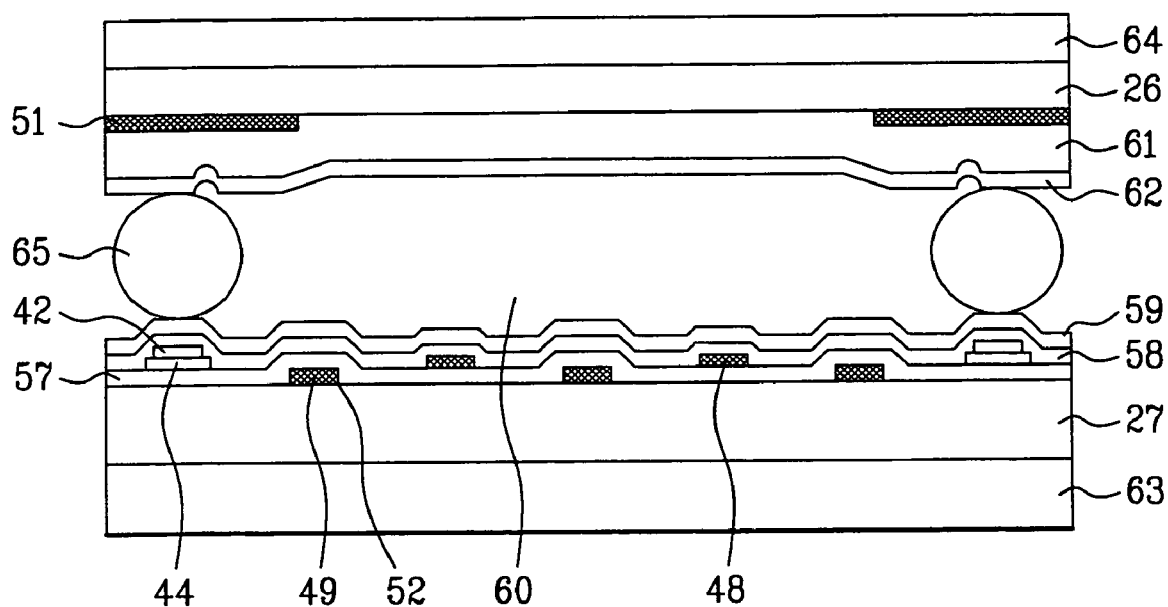
FIG. 5 is a cross-sectional view taken along the line B-B' of FIG.4.

Referring to FIGS. 4 and 5, a liquid crystal panel includes a TFT 55, a color filter layer 61, alignment layers 59, 62 over the first and second substrates 27, 26, respectively, a liquid crystal layer 60, and a spacer 65 between the first and second substrates 27, 26 to maintain a constant distance between the substrates 27, 26 and a polarizer on both surfaces of the liquid crystal panel.

In FIG. 4, the TFT 55 on the first substrate 27 is disposed at a region where a gate bus line 41 and data bus line 42 are crossed perpendicularly with each other. A common bus line 43 parallel to the gate bus line 41 is formed in the center of a pixel in a matrix form. A common electrode 49 connected to the common bus line 43 is formed in the pixel. A data electrode 48 connected to the drain electrode 47 of the TFT 55 is formed in parallel to the common electrode 49.

Figure 6A:
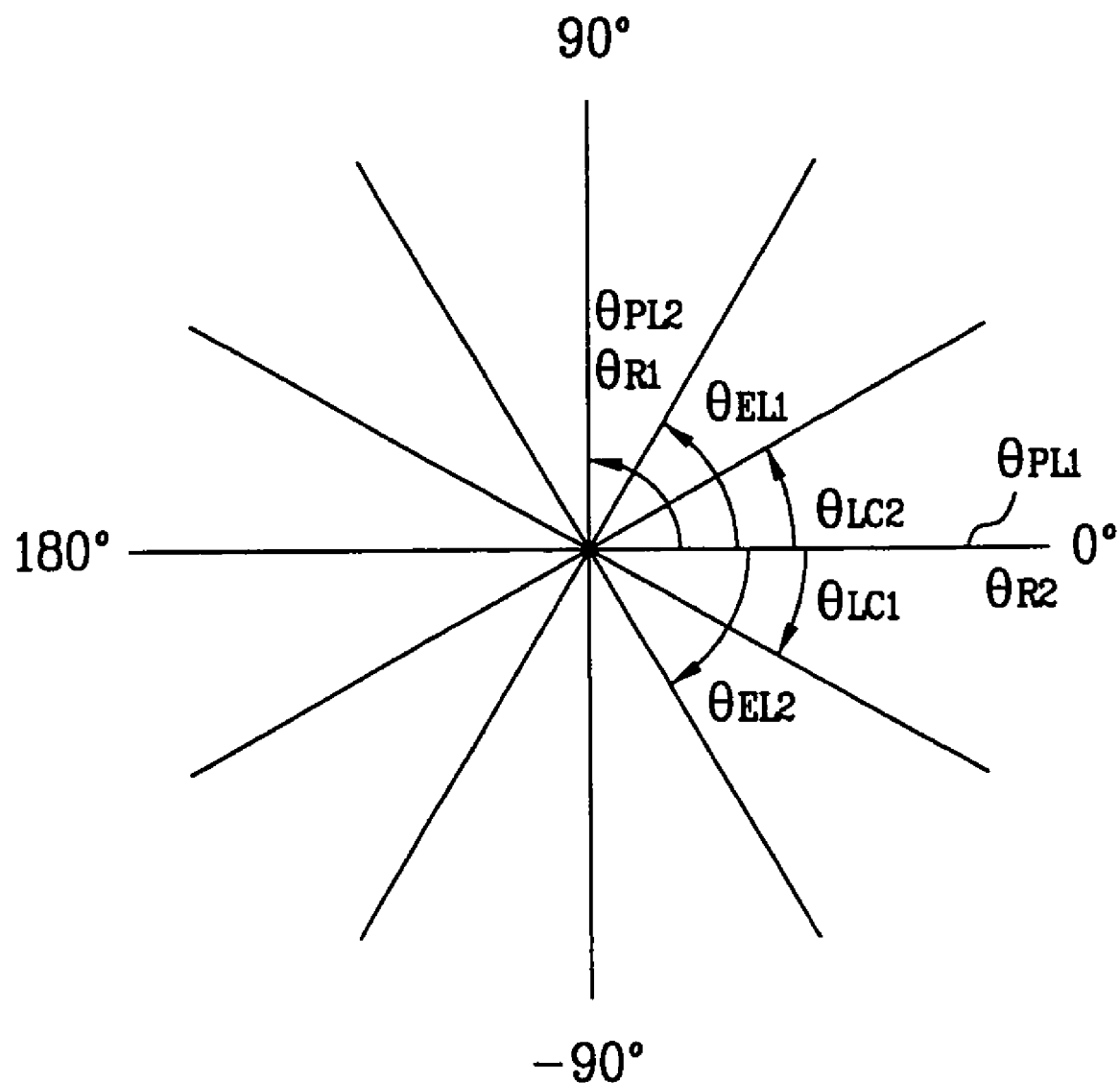
FIG. 6 illustrates an axis directional relationship of the in-plane switching mode liquid crystal display device in accordance with the first embodiment of the present invention.
Figure 6B:
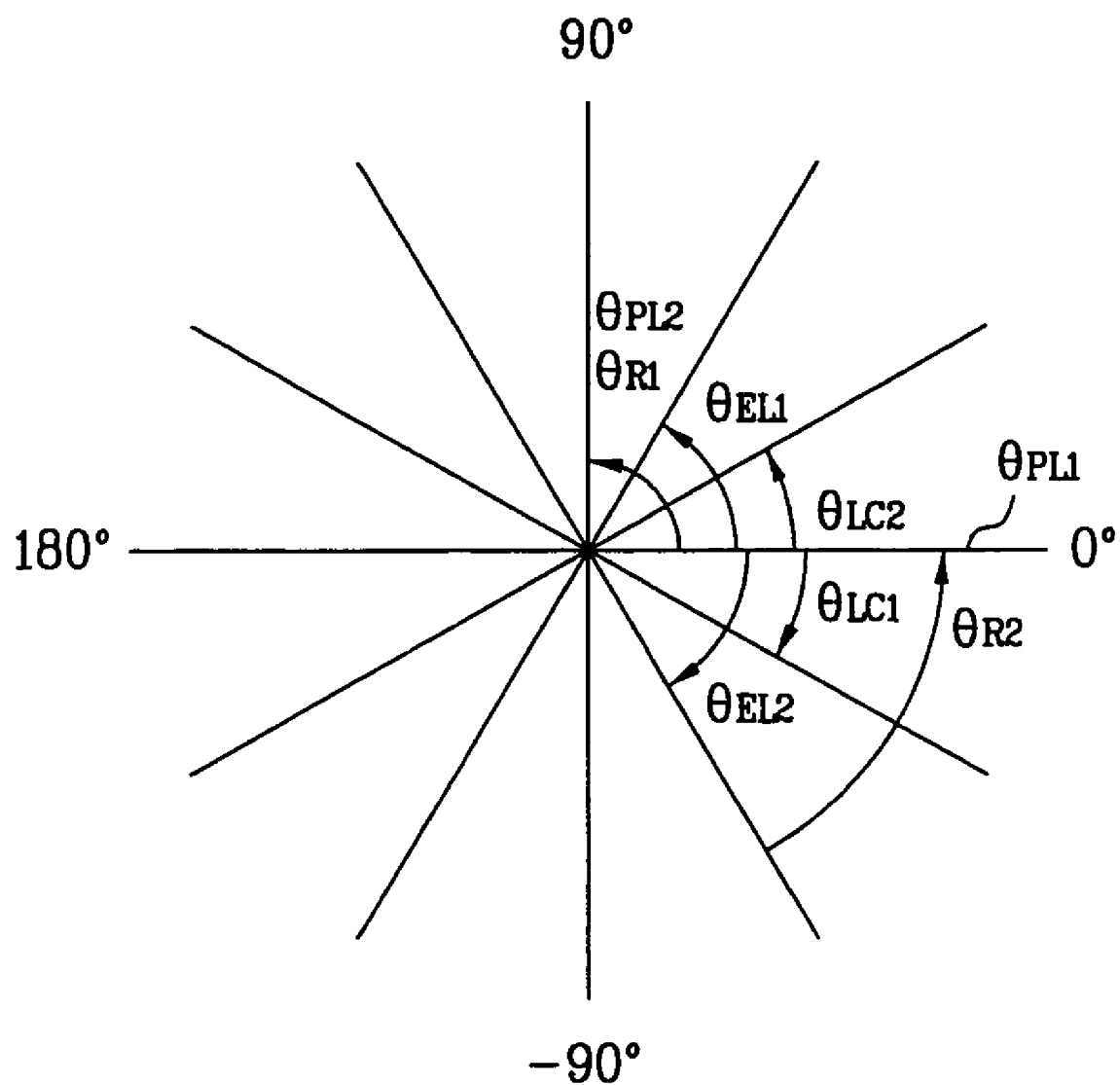
Figure 6C:
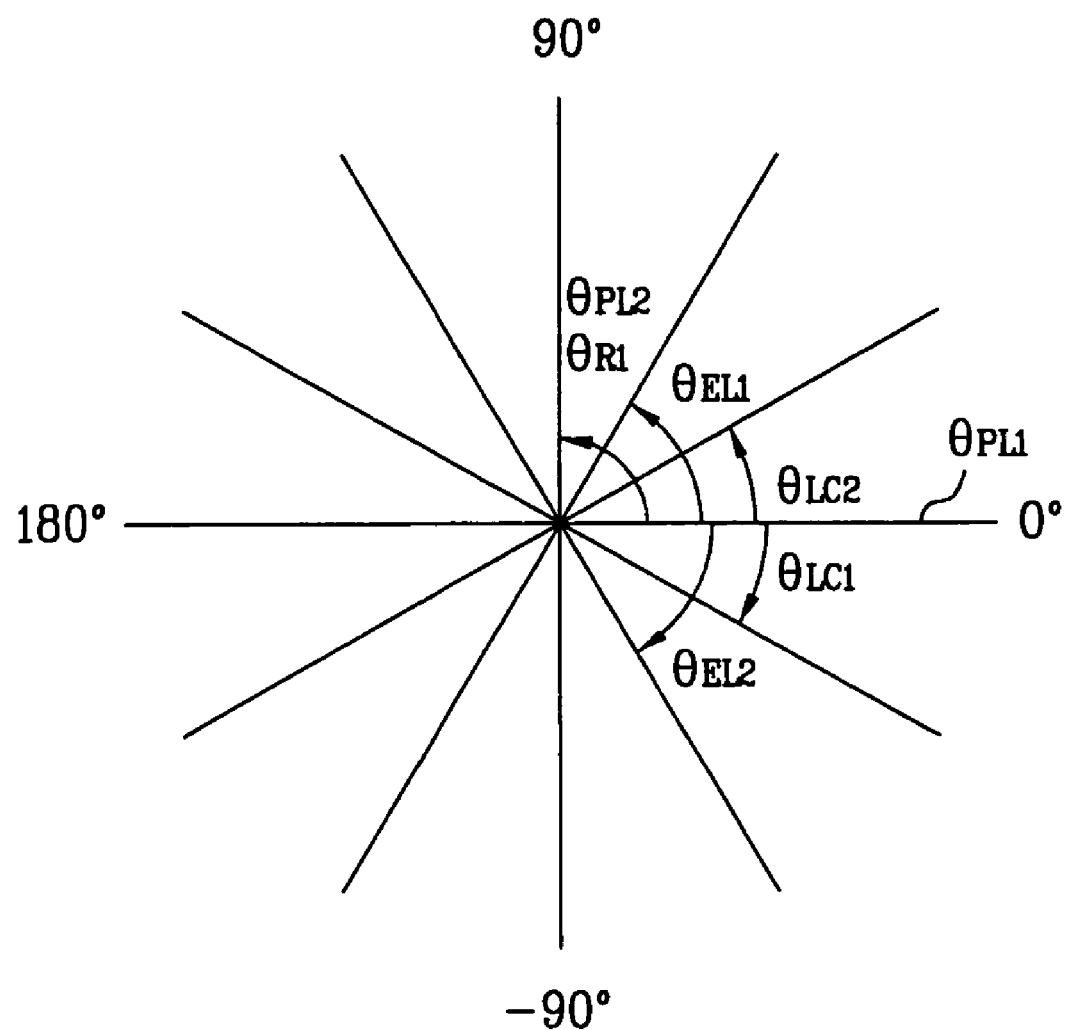

Referring to FIGS. 5 and 6, the pixel is divided into a first region I and a second region II the by common bus line 43. $\theta_{EL1}$ is an electrode elongation direction in the first region I, and $\theta_{PL1}$ is a polarization direction of polarizer 63. $\theta_{EL2}$ is an electrode elongation direction in the second region II, and $\theta_{PL2}$ is a polarization direction of analyzer 64. $\theta_R$ is a rubbing direction, $\theta_{LC1}$ and $\theta_{LC2}$ are optical axis directions of a liquid crystal molecules in the first and second region, respectively. Electrode elongation directions of the first region I and the second region II are symmetric to the common bus line 43. Thus, the angles $\theta_{EL1}$, $\theta_{EL2}$ of the electrodes in each region I, II relative to the common bus line 43 are the same. A voltage is applied to the gate bus line 41 in the longitudinal direction of the liquid crystal display device. The rubbing direction of the first substrate 27 is not parallel to that of the second substrate 26. The rubbing direction is parallel to the polarization direction($\theta_{PL2}$) of the analyzer 64. The polarization direction($\theta_{PL2}$) of the analyzer 64 is perpendicular to the polarization direction($\theta_{PL1}$) of the polarizer 63.

The gate bus line 41, the common bus line 43, and the common electrode 49 are made of an AlTa thin film (3% Ta content) having a thickness of 0.3 μm deposited by a sputtering process. The AlTa thin film surface is anodized to form the AlTa oxidation layer 52 having a thickness of 0.1 μm, so that the electrode surface has a higher insulation characteristic. Also, a short circuit due to a thin thickness is prevented on the electrode surface. After a gate insulating layer 57 having a thickness of 0.3 μm, an amorphous silicon (a-si) layer 44 having a thickness of 0.2 μm, and n$^+$-Si layer are consecutively deposited on the AlTa oxidation layer 52 by PECVD (plasma enhanced chemical vapor deposition), a photoetching process is executed to form the TFT 55.

Then, a chromium layer having a thickness of 0.1 μm is deposited on the TFT 55 and etched by the sputtering process. A photoetching process is further conducted to form a source electrode 46, drain electrode 47 of the TFT 55, and the data electrode 48. The n$^+$-silicon layer on a channel unit of the TFT 55 is removed by a dry-etching process using the source electrode 46 and the drain electrode 47 as masks. Thus, a-Si layer remains only on the channel unit. Thereafter, a passivation layer 58 having a thickness of 0.2 μm is deposited on the entire surface over the first substrate 27 by PECVD. For example, $Si_xN_y$ may be used as the passivation layer 58. Subsequently, the passivation layer 58 is partially etched on the end portion of the gate bus line 41 and data bus line 42 to connect the bus lines 41, 42 with the outer driver circuit.

A storage capacitor 53 (shown in FIG. 4) is formed at an overlapping region of the common bus line 43 and a data electrode 48. The storage capacitor 53 maintains uniform the electric charges of the data voltage in the each pixel.

A black matrix 51 (shown in FIG. 5) and a color filter layer 61 are formed on the second substrate 26. An overcoat layer (not shown) is formed on the black matrix 51 and the color filter layer 61 to obtain the high stability of the surface and improve the flatness. The black matrix 51 prevents the leakage of light at the gate bus line 41, the data bus line 42, the common bus line 43, and the TFT 55. The black matrix 51 is formed by, etching a Cr/$Cr_xO_y$ layer having a thickness of about 0.1 μm in each region. R, G, and B layers are formed respectively on the color filter layer of the each pixel.

In the aforementioned-structure of the LCD, the widths of data electrode 48, the common electrode 49 and the gap between the electrodes are 5 μm each.

An alignment layers 59, 62 are formed on the first and second substrates 27 and 20 by depositing and baking a serial No.RN1024 of Nissan Chemical having a thickness of 0.08 μm. While the alignment layer 59 over the first substrate 27 is rubbed in the direction of −90° with respect to elongation direction of the common bus line, the alignment layer 62 on the second substrate is rubbed in the direction of 90°. For a spacer 65, a Micropearl of SEKISUI FINE-CHEMICAL having a diameter of 6.4 μm is used to have a liquid crystal layer 60 having a thickness of 6.2 μm. And for liquid crystals, a positive liquid crystal such as ZGS 5025 (Δn=0.067, Δε=6.0) of CHISSO CO. is used. At this time, the pre-tilt angle of the aligned liquid crystal molecules is about 4.8°, and the retardation value (Δnd) is about=0.41.

The optical transmission axis direction ($\theta_{PL1}$) of the polarizer 63 attached to the first substrate 27 is parallel to the longitudinal direction of the gate bus line 41. The optical transmission axis direction ($\theta_{PL2}$) of the analyzer 64 attached to the second substrate 26 is perpendicular to the longitudinal direction of the gate bus line 41.

The gap between the data electrode 48 and the common electrode 49 is thinner than a thickness of liquid crystal layer and the retardation value (Δnd) of the liquid crystal satisfies the following equation.

$$\lambda/2 < \Delta nd \leq \lambda$$

where, Δn is an anisotropy of a refractive index of the liquid crystal, d is a thickness of the liquid crystal layer, and λ is a wavelength.

The data electrode 48 and the common electrode 49 in the first region I and the second region II are formed to have angles $\theta_{EL1}$ and $\theta_{EL2}$, respectively, with respect to the common bus line 43. The data electrode 48 and the common electrode 49 are symmetric with each other.

Figure 7A:
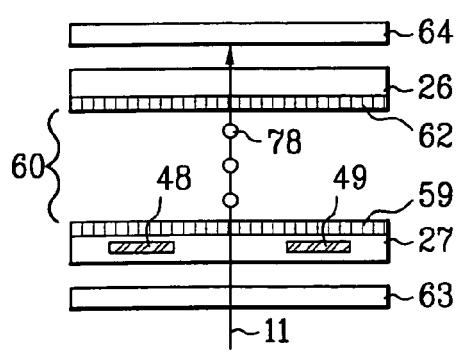
FIGS. 7A to 7D are schematic views illustrating an operation of the in-plane switching mode liquid crystal display device in accordance with the first embodiment of the present invention.
Figure 7C:
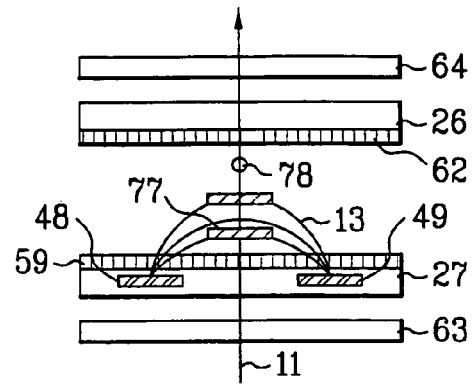
Figure 7B:
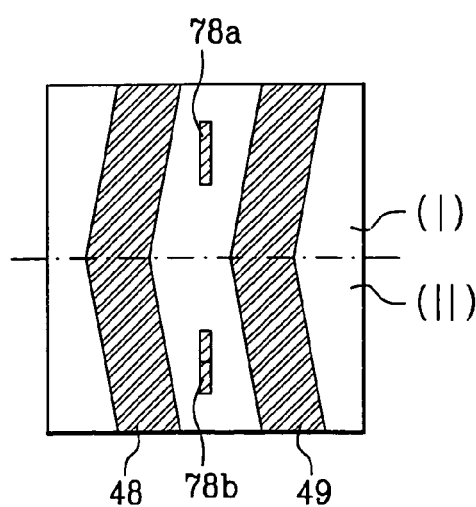
Figure 7D:
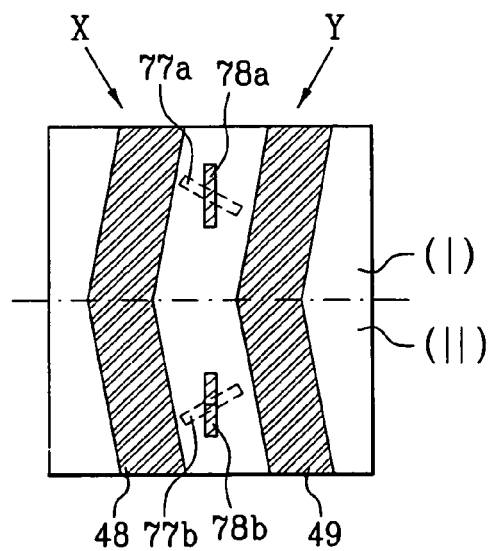

Operation of the present in-plane switching mode liquid crystal display device will now be described with reference to FIGS. 7A to 7D. FIGS. 7A and 7B are cross-sectional views of the in-plane switching mode liquid crystal display device and a plane view of off-state LCD, and FIGS. 7C and 7D are for on-state LCD, respectively.

The elongated direction of the conventional electrodes has an angle of 90° relative to the longitudinal direction(0°) of the gate bus line. However, the electrodes of the present invention on the first region I and the second region II are respectively extended in the directions with angles $\theta_{EL1}$ and $\theta_{EL2}$ relative to the longitudinal direction of the gate electrode. The electrodes in the first region I and in the second region II are thus symmetric with each other. Here, the value of the angles satisfies the following equations.

$$0° < \theta_{EL1} < 90°,\ -90° < \theta_{EL2} < 0°,\ \text{and}\ |\theta_{EL1}| = |\theta_{EL2}|.$$

When the voltage is not applied to the electrodes, the optical axis of all the liquid crystal molecules in the liquid crystal layer, set in between the first substrate 27 and the second substrate 26 is aligned almost parallel to the substrate by the alignment layer 59, 62, as shown FIGS. 7A and 7B. For example, the liquid crystals between the substrates are nematic liquid crystals without a choral dopant. A light 11 incident to the first substrate 27 is polarized linearly by the polarizer 63, transmitted to the liquid crystal layer 60, and reaches the analyzer 64. However, since the polarization directions of the analyzer 64 and the polarizer 63 are perpendicular with each other, the light 11 is not transmitted to the analyzer 64. Therefore, the LCD screen becomes a black mode.

Conversely, when the voltage is applied to the electrodes 48, 49, a parallel electric field 13 is applied in the liquid crystal layer 60 through a data voltage between the data electrode 48 and the common electrode 49. The parallel electric field 13 has a maximum value ($E_1$) on the surface of an alignment layer 59 of first substrate 27, a near threshold value ($E_2$) on the surface of the alignment layer 62 of the second substrate 26, and a medium value ($E_M=(E_1+E_2)/2$) in the middle of the liquid crystal layer. When the parallel electric field 13 is not uniform, the intensity of the parallel electric field 13 becomes gradually smaller from the first substrate 27 to the second substrate 26. Such a non-uniform electric field in the liquid crystal layer 60 can be formed by making the thickness of the liquid crystal layer 60 larger than the gap between the electrodes. A liquid crystal molecule 77a, which is near the surface of alignment layer 59 in the first region I, is affected by the non-uniform electric field. The optical axis direction ($\theta_{LC1}$) of the liquid crystal molecules is thus changed to be perpendicular to the electrode elongation direction ($\theta_{EL1}$).

Similarly, in a liquid crystal molecule 77b near the surface of alignment layer 59 in the second region II, the optical axis direction ($\theta_{LC2}$) is also changed to be perpendicular to the electrode elongation direction ($\theta_{EL2}$) in the second region II. Further, since the electric field applied to the liquid crystal molecules 78a, 78b near the surface of the alignment layer 62 in the regions I, II is the near threshold value, the molecules 78a, 78b are not affected by the electric field so that the optical axis is not changed. Therefore, by applying the non-uniform electric field, the liquid crystal molecules in the liquid crystal layer between the substrates 26, 27 are gradually changed from the first substrate 27 to the second substrate 26. As a result, the molecules are in a twisted state.

The liquid crystal molecules 77a, 78a are twisted counterclockwise from a direction parallel to the rubbing direction ($\theta_R$). The direction is perpendicular to the longitudinal direction of the gate bus line 41 and the direction of $\theta_{LC1}$ in the first region I. The liquid crystal molecules 77b, 78b are twisted clockwise from a direction perpendicular to the longitudinal direction of the gate bus line 41 and the $\theta_{LC2}$ in the second region II. As a result, the liquid crystal molecules in the first region I and the second region II are twisted in the opposite direction with each other.

When the linearly polarized light 11 through the polarizer 63 is transmitted to the liquid crystal layer 60, the polarization direction of the light is rotated by the twisted liquid crystal layer 60 and the optical axis direction is directed to the same direction of the polarization direction in the analyzer 64. The light 11 linearly polarized by the polarizer 63 and transmitted to the liquid crystal layer 60 is thus transmitted to the analyzer so that the LCD screen becomes a white mode.

Here, the amount of the light transmittance depends on the twisted angle of the liquid crystal molecules. Thus, when the twisted angle of the liquid crystal molecules become larger, the amount of light transmittance also becomes larger. A grey level of the liquid crystal display device can also be controlled with the data voltage by twisting the liquid crystal molecules.

For example, when the voltage applied to the electrode is 1V–5V, the liquid crystal molecules in the first region I and the second region II are arranged symmetrically with each other by the electric field of the each region having an intermediate grey level. Thus, the color shifting occurred in the viewing angle directions of X, Y the first region I and the second region II is different from each other. The viewing angle direction of X causes the blue shift and the viewing angle direction of Y causes the yellow shift in the first region I. On the other hand, the viewing angle direction of X causes the yellow shift and the viewing angle direction of Y causes the blue shift in the second region II. Therefore, the total color shifting caused by the birefringence ratio of the liquid crystal molecules is corrected by the color shifting in the first and second regions I, II, so that the desired color can be obtained in whole pixels.

In order to maximize the optical transmittance ratio of the liquid crystal layer 60 at the maximum voltage, the retardation value ($\Delta nd$) of the liquid crystal layer 60 must be about $0.74\lambda$. Accordingly, the anisotropy of the refractive index ($\Delta n$) and a thickness of the liquid crystal layer (d) has to be limited to get the maximum optical transmittance ratio. The general twist nematic liquid crystal layer has the anisotropy of refractive index of about 0.06–0.09 and the thickness of 6.0–8.8 μm when the wavelength of the incident light is about 0.56 μm.

Figure 8A:
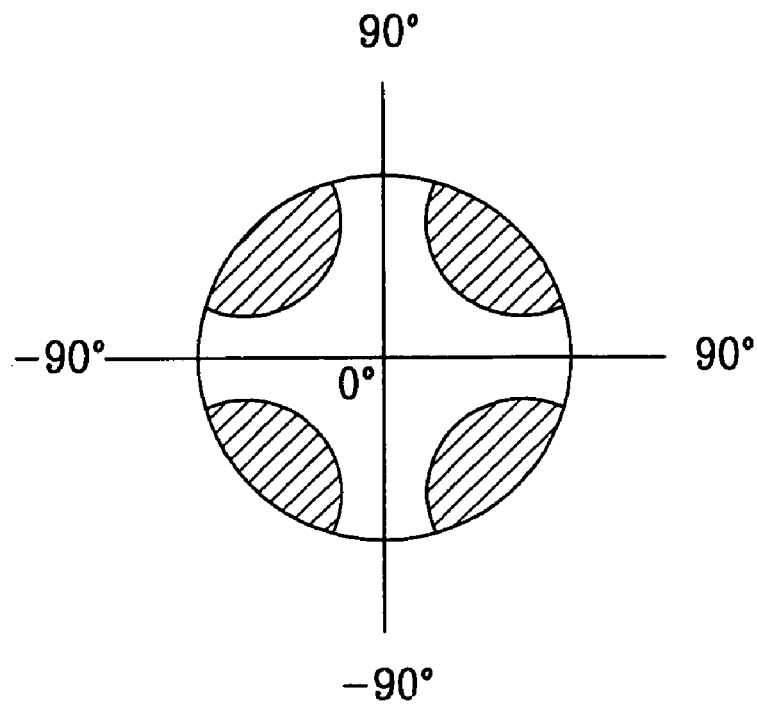
FIG. 8A illustrates a gray invention region in the conventional in-plane switching mode liquid crystal display device.
Figure 8B:
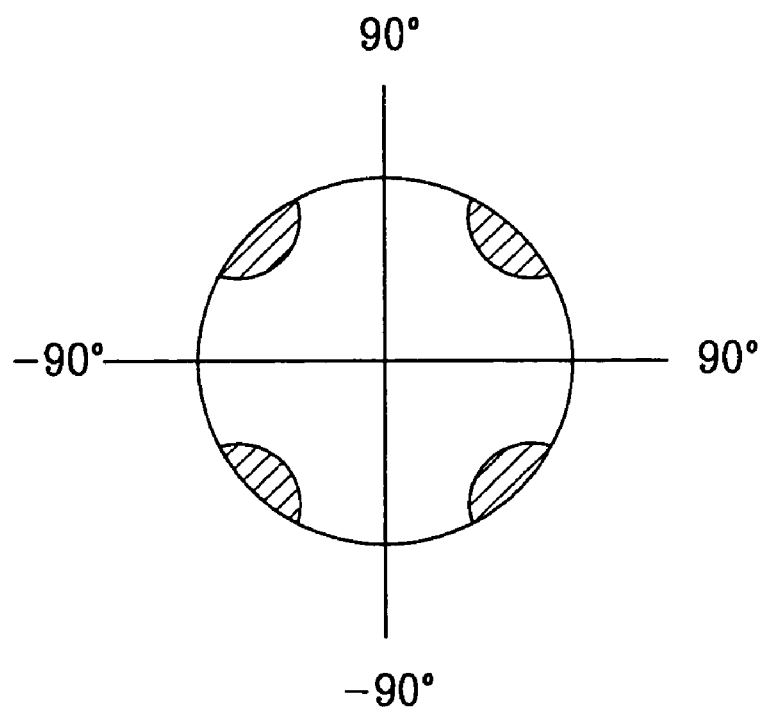
FIG. 8B illustrates a gray inversion region of the in-plane switching mode liquid crystal display device in accordance with the first embodiment of the present invention.

FIG. 8A and FIG. 8B illustrate the viewing angle characteristics according to the conventional in-plane switching liquid crystal display device and the first embodiment in-plane switching liquid crystal display device, respectively. Hatched regions are viewing angle regions with the contrast ratio of 10:1 or less. As shown in FIG. 8A, the regions have the lower contrast ratio at four inclined viewing angle direction in the conventional liquid crystal display device.

In the present liquid crystal display device, the regions also have the lower contrast ratio at four inclined viewing angle direction, as shown in FIG. 8B, but the regions are much smaller than the regions in the conventional LCD. That is, the liquid crystal display device of the present invention provides regions having a contrast ratio more than 10:1 is larger than the conventional in-plane switching LCD. Also, the viewing angle characteristic is improved in both the vertical and horizontal directions. This results from the color shifting according to the viewing angle becomes smaller and the contrast ratio of the screen is increased.

Figure 9:
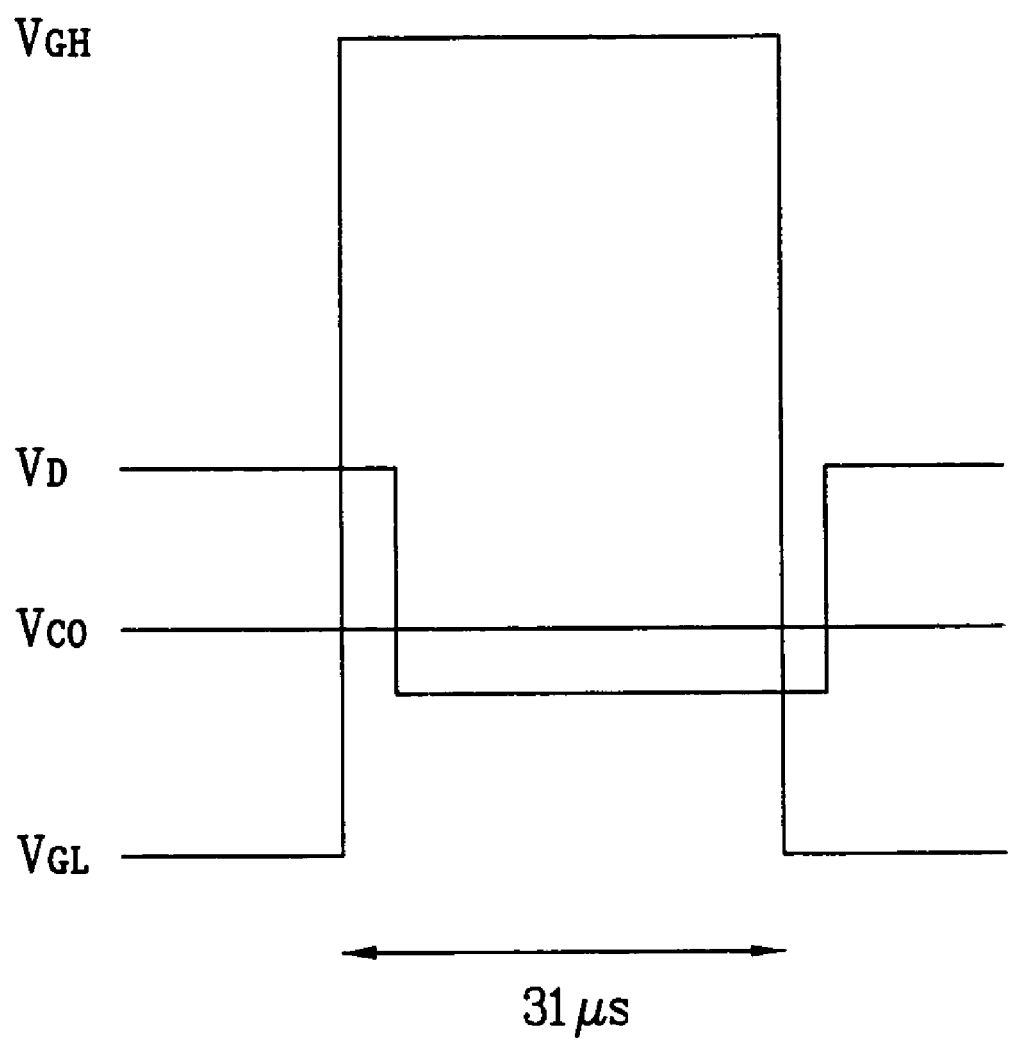
FIG. 9 illustrates a driving voltage waveform of the in-plane switching mode liquid crystal display device in accordance with the first embodiment of the present invention.

FIG. 9 is a driving voltage waveform of the liquid crystal display device according to the first embodiment. For example, in this embodiment, the screen size is 12.1 inch and the pixel number of 480*640 (*R·G·B). A gate voltage $V_{GH}$, ground voltage $V_{GL}$, and common voltage $V_{CO}$ are 20, 0, and 8V, respectively, and a pulse width is 31 μs. The data voltage $V_D$ is taken as a single pulse signal having a frequency of 31 μs, and a maximum ±6V, and minimum ±1V with respect to the common voltage $V_{CO}$. The data voltage $V_D$ may be controlled to have 5V in the signal region. Also, by adjusting the common voltage, the AC voltage is applied between the common electrode 49 and the data electrode 48.

Materials for the alignment layers on the first substrate and the second substrate do not have to be the same in the present invention. On the first substrate, for example, the alignment layer including a material having a lower anchoring energy and a lower rubbing density may be coated to rotate the liquid crystal molecules easily. On the other hand, the alignment layer such as polygamic acids base material having a lower pre-tilt angle and good absorption characteristics of impurity from the liquid crystal may be coated on the second substrate to improve the viewing angle characteristics and remove the after-image.

Also, the pixel is divided into the first region and the second region in the first embodiment. Moreover, when the pixel is divided into more than two regions, the first region and the second region may be arranged to have more effective liquid crystal display devices.

Figure 10:
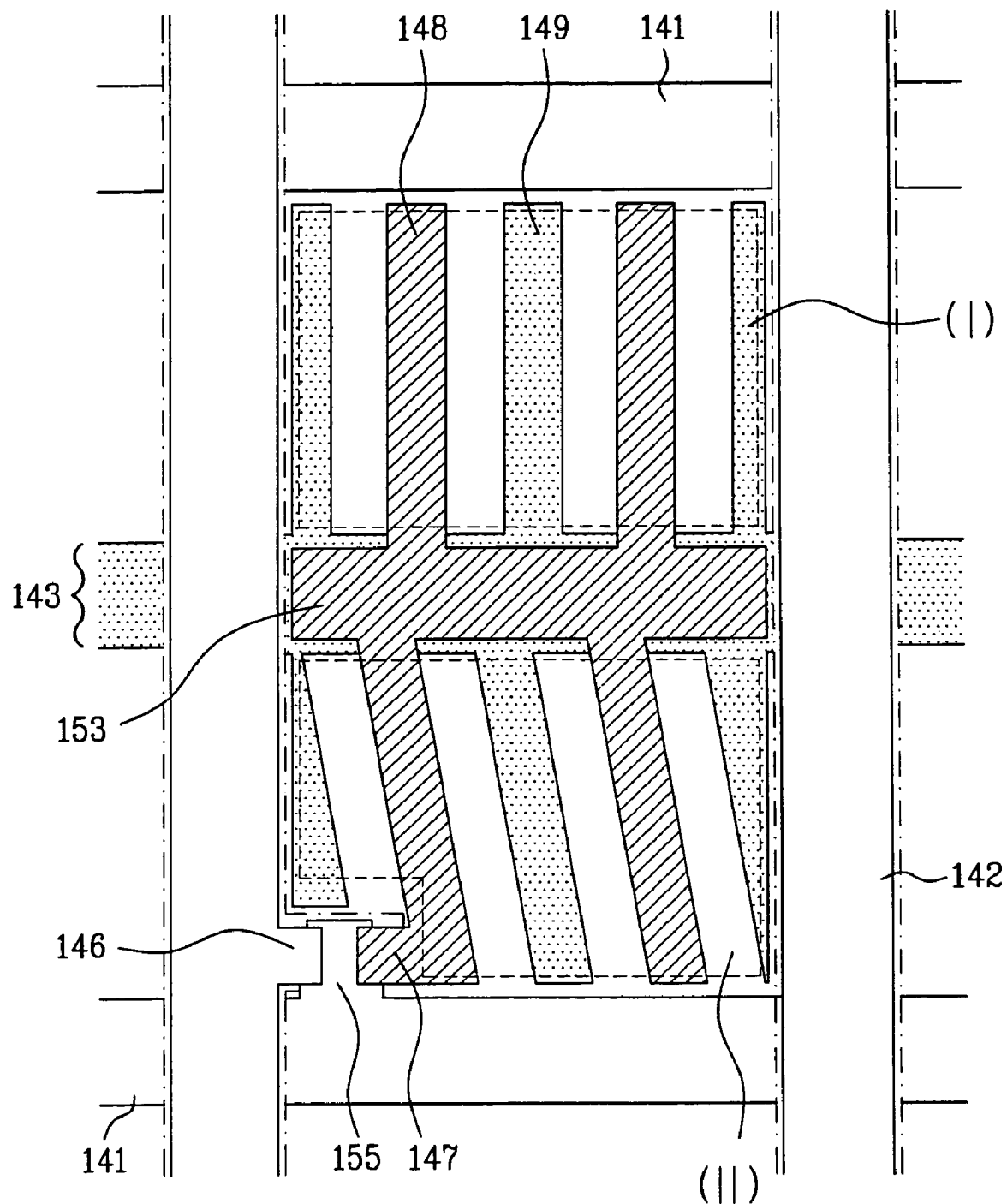
FIG. 10 is a plane view of the in-plane switching mode liquid crystal display device in accordance with a second embodiment of the present invention.
Figure 11:
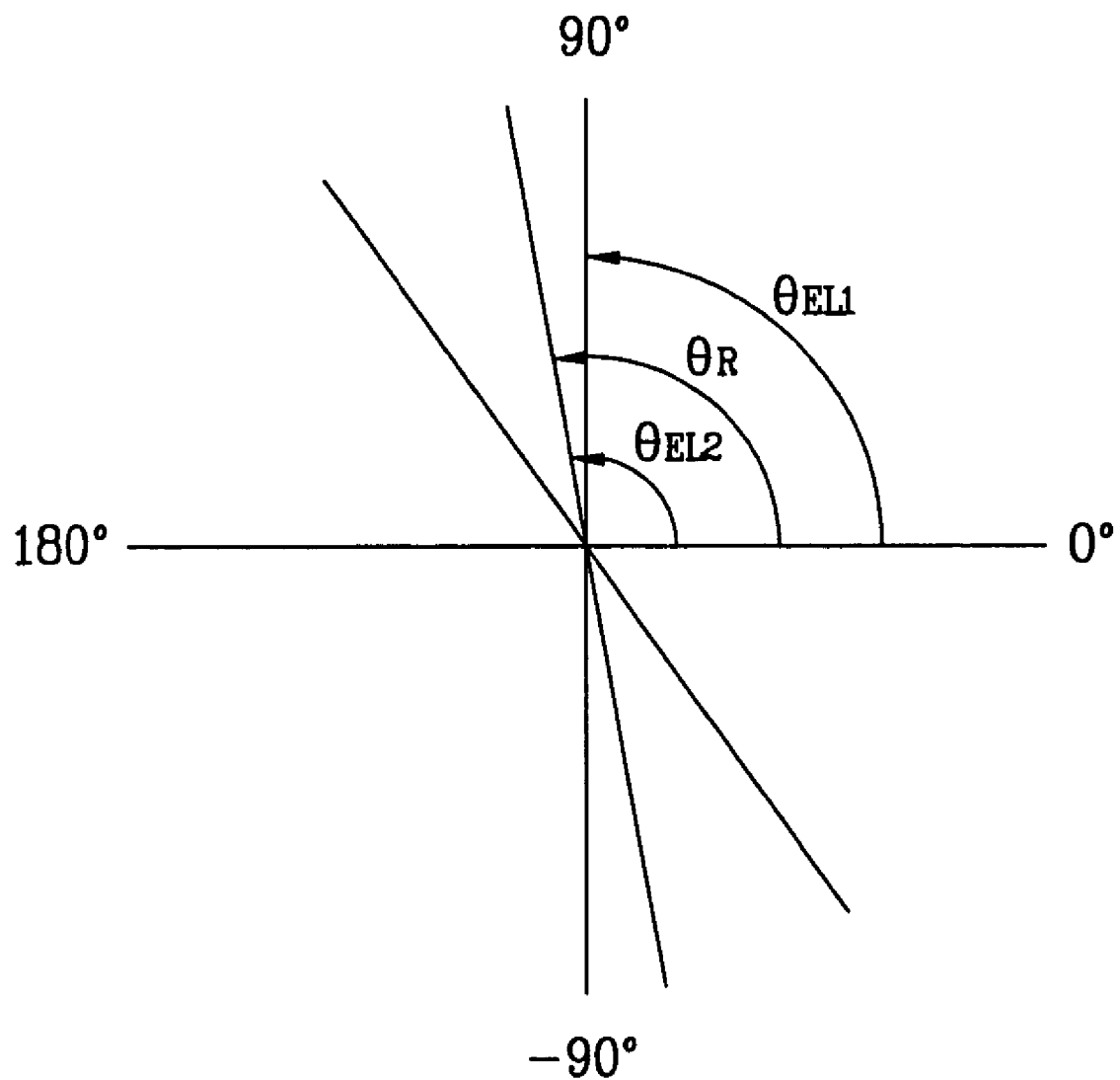
FIG. 11 is an axis directional relationship of the in-plane switching mode liquid crystal display device in accordance with the second embodiment of the present invention.

Referring to FIGS. 10 and 11, a second embodiment in the present invention will be described as following. As shown in the FIG. 10, the pixel is divided into a first region I and second region II. A common bus line 153 is formed between the regions I and II. A common electrode 148 in the second region II is connected to a source electrode 147 of the TFT. The common electrode 148 in the first region is elongated in the directions of $\theta_{EL1}=90°$ relative to longitudinal direction of the gate bus line 141 (i.e., 0° in FIG. 11) and $90°<\theta_{EL2}<180°$ in the second region. A rubbing angle direction ($\theta_R$) in the alignment layer is relative to the longitudinal direction of the gate bus line 141. The angle $\theta_R$ of the rubbing direction in the alignment layer is larger than the angle $\theta_{EL1}$ of the electrode elongation direction in the first region, and smaller than the angle $\theta_{EL2}$ of the electrode elongation direction in the second region. Thus, the relationship among the angles of $\theta_{EL1}$, $\theta_R$, $\theta_{EL2}$, is, $\theta_{EL1}<\theta_R<\theta_{EL2}$.

Therefore, the liquid crystal molecules in the first region I and the second region II are aligned symmetrically with each other and rotated in the opposite direction with each other having the intermediate grey level in the applied voltage state. Therefore, the color shifting according to the viewing angle direction is compensated as similarly in the first embodiment.

Figure 12:
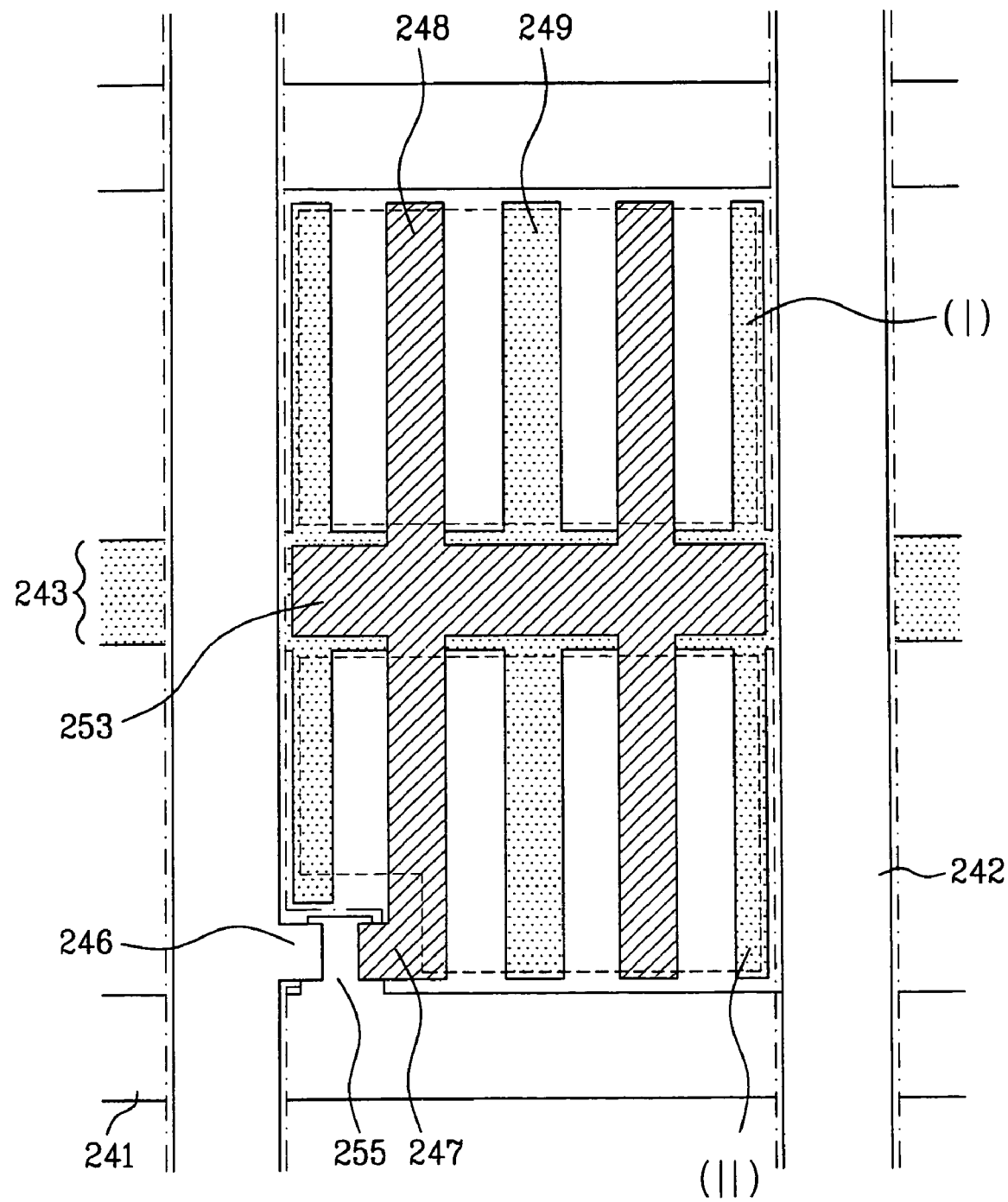
FIG. 12 is a plane view of the in-plane switching mode liquid crystal display device in accordance with a third embodiment of the present invention.
Figure 13:
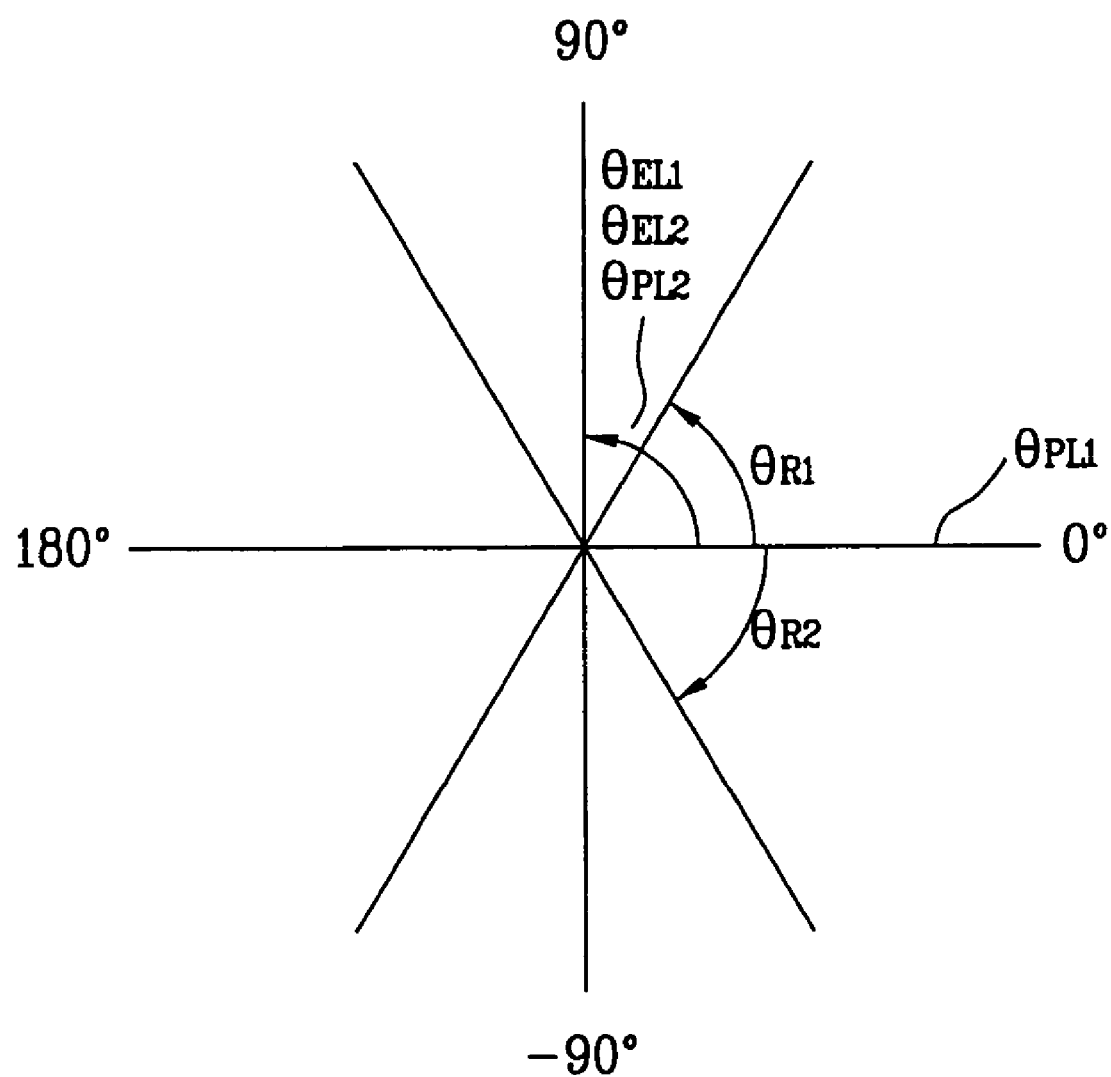
FIG. 13 is an axis directional relationship of the in-plane switching mode liquid crystal display device in accordance with the third embodiment of the present invention.

Referring to FIGS. 12 and 13 a third embodiment will be described. An optical axis direction of the pixel is shown in FIG. 13. While the electrode elongation direction is divided into several regions in the pixel in the first and second embodiments, the electrode elongation direction of all of the pixel is the same and a rubbing direction is different from each region. Further, it is possible to control the alignment state of the liquid crystal molecules in each region in the third embodiment. The angles $\theta_{EL1}$, $\theta_{EL2}$ of electrode elongation directions on the first region I and the second region II are $\theta_{EL1}=90°$, $\theta_{EL2}=90°$, respectively, relative to the longitudinal direction (shown as 0° in FIG. 13) of the gate bus line 241, and the angles $\theta_{R1}$, $\theta_{R2}$ of rubbing directions in each region are $0°<\theta_{R1}<90°$, $-90°<\theta_{R2}<0°$. Also, the relationship between the rubbing direction ($\theta_{R1}$) of the first region I and the rubbing direction ($\theta_{R2}$) of the second region II is $\theta_{R1}=-\theta_{R2}$. The liquid crystal molecules on the first region I and the second region II are thus rotated clockwise and counterclockwise, respectively. The molecules are in the opposite direction with each other at an intermediate grey level in the applied voltage state and aligned symmetrically relative to the longitudinal direction of the gate bus line 241. Thus, the color shifting according to viewing angle direction is compensated in this embodiment.

Figure 14:
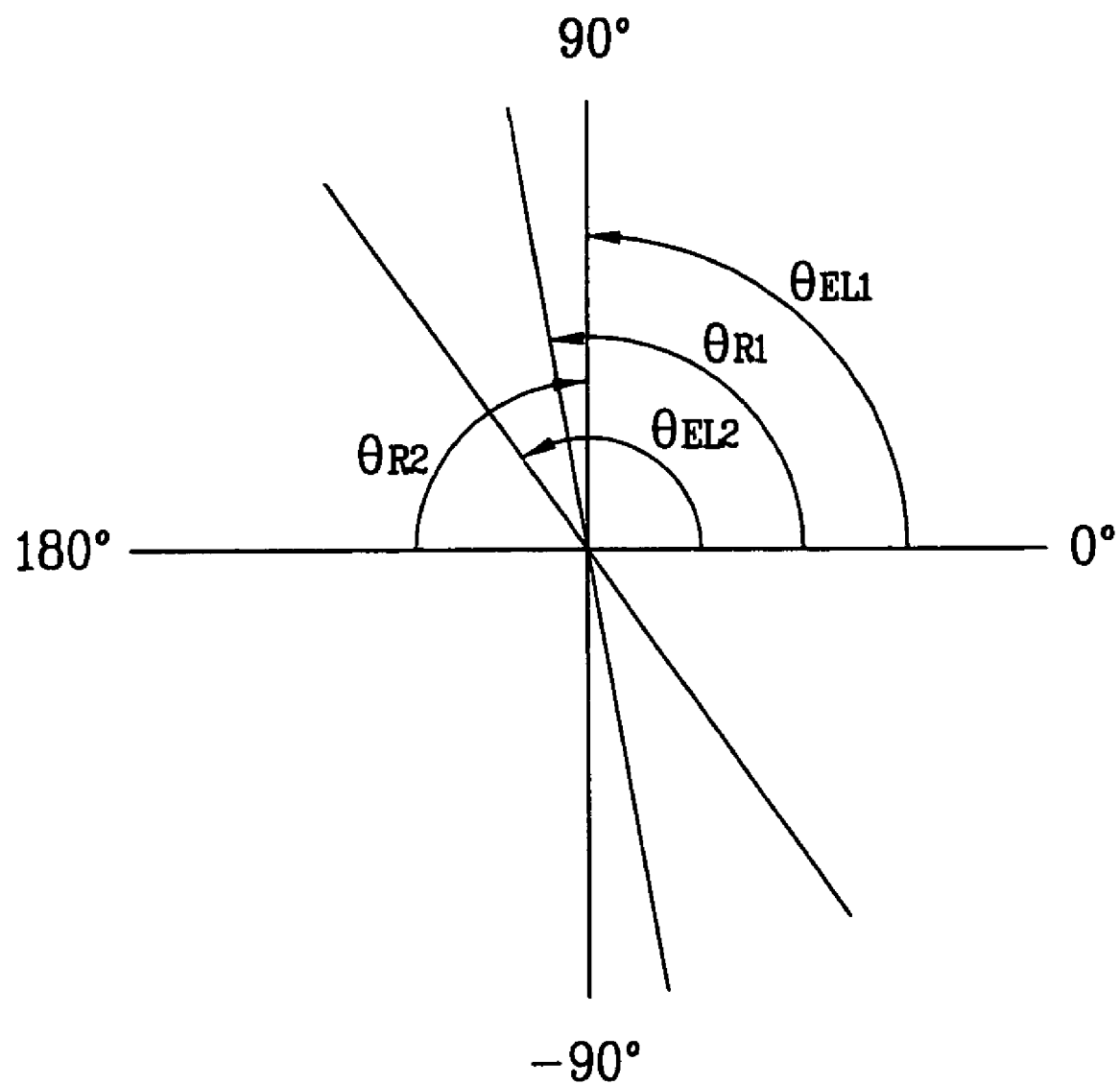
FIG. 14 is an axis directional relationship of the in-plane switching mode liquid crystal display device in accordance with a fourth embodiment of the present invention.

Referring to FIG. 14, a fourth embodiment will be described. The angles $\theta_{EL1}$ and $\theta_{EL2}$ of electrode elongation directions of the first region and the second region are 90° and between 90° and 180°, respectively, relative to the longitudinal direction of the gate bus line. First and second alignment layers have first and second alignment directions $\theta_{R1}$ and $\theta_{R2}$, respectively. The relationship between the alignment directions $\theta_{R1}$ and $\theta_{R2}$ is such that $\theta_{EL1}<\theta_{R1}<\theta_{EL2}$ and $\theta_{R2}=180°-\theta_{EL1}$.

The rubbing process is to determine the alignment direction of the alignment layer in the each embodiments. The alignment direction may also be determined by irradiating the ultraviolet light into the alignment layer using the light alignment material as an alignment layer.

The present invention provides an in-plan switching mode liquid crystal display device that the pixel is divided into a plurality of regions. The data electrode and the common electrode of each region are symmetric relative to the longitudinal direction of the gate bus line. The electrode elongation direction is in common relative to the longitudinal direction of the gate bus line and the rubbing directions are different from each region. The color shifting is, thus, corrected by the birefringence of the liquid crystals.

Further, since the rotation angle of the twisted liquid crystal molecules is large, the liquid crystal layer may be formed with a large thickness. The inexpensive driving IC may be used to maintain the maximum transmittance ratio because of the lower driving voltage. Also, the light through the liquid crystal layer remains in the linearly polarized state without using the polarizer so that the production cost is reduced for color shift correction. Moreover, a liquid crystal display device having a high reliability may be fabricated with the conventional twisted nematic liquid crystal in the present invention.

It will be apparent to those skilled in the art that various modifications and variations can be made in the liquid crystal display device of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   first and second substrates;
   a plurality of gate bus lines and data bus lines on the first substrate in a matrix form;
   a plurality of pixels defined by the gate bus lines and the data bus lines, the pixels having first and second regions;
   at least one common bus line at each pixel, the common bus line being parallel to the gate bus line and between the first and second regions;
   at least a pair of first parallel electrodes and second parallel electrodes in the first and second regions, respectively, the first and second parallel electrodes having first and second electrode elongation directions with respect to a longitudinal direction of the common bus line, the first and second electrode elongation directions being non-perpendicular to the longitudinal direction of the common bus line;
   first and second alignment layers over the first and second substrates, the first and second alignment layers having first and second alignment directions, respectively, wherein the first alignment direction is different from the second alignment direction; and
   a liquid crystal layer between the first substrate and the second substrate.

2. The device according to claim 1, wherein the first alignment layer has an anchoring energy lower than that of the second alignment layer.

3. The device according to claim 2, wherein the second alignment layer includes a polygamic acid base material.

4. The device according to claim 1, wherein the first alignment layer has a rubbing direction parallel to a polarized direction of an analyzer attached to the first substrate.

5. The device accordance to claim 4, wherein the polarizer attached to the second substrate has a polarized direction perpendicular to the polarized direction of the analyzer.

6. The device according to claim 1, wherein the first electrode elongation direction has an absolute value the same as that of the second electrode elongation direction.

7. The device according to claim 1, wherein the first and second electrode elongation directions are between 0° and 90° and between −90° and 0°, respectively.

8. A liquid crystal display device, comprising:
first and second substrates;
a plurality of gate bus lines and data bus lines on the first substrate in a matrix form;
a plurality of pixels defined by the gate bus lines and the data bus lines, the pixels having first and second regions;
at least one common bus line at each pixel, the common bus line being parallel to the gate bus line and between the first and second regions;
at least a pair of first parallel electrodes and second parallel electrodes in the first and second regions, respectively, the first and second parallel electrodes having first and second electrode elongation directions with respect to a longitudinal direction of the common bus line, the first and second electrode elongation directions being non-perpendicular to the longitudinal direction of the common bus line;
first and second alignment layers over the first and second substrates, the first and second alignment layers having first and second alignment directions, respectively; and
a liquid crystal layer between the first substrate and the second substrate;
wherein the liquid crystal layer has a retardation value ($\Delta nd$) of $\lambda/2 < \Delta nd < \lambda$ (where $\Delta n$ is an anisotropy of a refractive index, d is the thickness of the liquid crystal layer, and $\lambda$ is a wavelength of an incident light).

9. The device according to claim 8, wherein the retardation value is approximately $0.74\lambda$.

10. A liquid crystal display device, comprising:
first and second substrates;
a plurality of gate bus lines and data bus lines on the first substrate in a matrix form;
a plurality of pixels defined by the gate bus lines and the data bus lines, the pixels having first and second regions;
at least one common bus line at each pixel, the common bus line being parallel to the gate bus line and between the first and second regions;
at least a pair of first parallel electrodes and second parallel electrodes in the first and second regions, respectively, the first and second parallel electrodes having first and second electrode elongation directions with respect to a longitudinal direction of the common bus line, the first and second electrode elongation directions being non-perpendicular to the longitudinal direction of the common bus line;
first and second alignment layers over the first and second substrates, the first and second alignment layers having first and second alignment directions, respectively;
a liquid crystal layer between the first substrate and the second substrate; and
a first optical compensator between the polarizer and the first substrate.

11. A liquid crystal display device, comprising:
first and second substrates;
a plurality of gate bus lines and data bus lines on the first substrate in a matrix form;
a plurality of pixels defined by the gate bus lines and the data bus lines, the pixels having first and second regions;
at least one common bus line at each pixel, the common bus line being parallel to the gate bus line and between the first and second regions;
at least a pair of first parallel electrodes and second parallel electrodes in the first and second regions, respectively, the first and second parallel electrodes having first and second electrode elongation directions with respect to a longitudinal direction of the common bus line, the first and second electrode elongation directions being non-perpendicular to the longitudinal direction of the common bus line;
first and second alignment layers over the first and second substrates, the first and second alignment layers having first and second alignment directions, respectively;
a liquid crystal layer between the first substrate and the second substrate; and
a second optical compensator between the second substrate and the analyzer.

12. A liquid crystal display device having a plurality of pixels each including a plurality of regions, the device comprising:
first and second substrates;
a liquid crystal layer having liquid crystal molecules between the first and second substrates;
a common bus line between first and second regions in at least one of said pixels;
a plurality of electrodes in each region of the pixels, an electric field parallel to the substrate being applied to the electrodes, the plurality of electrodes in at least one of the regions being non-parallel and non-perpendicular to the common bus line; and
first and second alignment layers over the first and second regions respectively, the first and second alignment layers having first and second alignment directions relative to an electrode elongation direction, wherein the first alignment direction is different from the second alignment direction.

13. The device according to claim 12, wherein the liquid crystal molecules in each region and a neighboring region are rotated in directions opposite with each other when an electric field is applied in the device.

14. The device according to claim 12, wherein the electrodes include at least a pair of electrodes.

15. The device according to claim 14, wherein the pair of electrodes include a data electrode and a common electrode.

16. The device according to claim 12, wherein the first and second alignment directions are symmetric with respect to the common bus line.

17. A liquid crystal display device having a plurality of pixels each including a plurality of regions, the device comprising:
first and second substrates;
a liquid crystal layer having liquid crystal molecules between the first and second substrates;
a common bus line between first and second regions in at least one of said pixels;
a plurality of electrodes in each region of the pixels, an electric field parallel to the substrate being applied to the electrodes, the plurality of electrodes in at least one of the regions being non-parallel and non-perpendicular to the common bus line; and
first and second alignment layers over the first and second regions respectively, the first and second alignment layers having first and second alignment directions relative to an electrode elongation direction;
wherein the electrodes include at least a pair of electrodes;
wherein a gap between the pair of electrodes is smaller than a thickness of the liquid crystal layer.

18. A liquid crystal display device having a plurality of pixels each including a plurality of regions, the device comprising:
  first and second substrates;
  a liquid crystal layer having liquid crystal molecules between the first and second substrates;
  a common bus line between first and second regions in at least one of said pixels;
  a plurality of electrodes in each region of the pixels, an electric field parallel to the substrate being applied to the electrodes, the plurality of electrodes in at least one of the regions being non-parallel and non-perpendicular to the common bus line; and
  first and second alignment layers over the first and second regions respectively, the first and second alignment layers having first and second alignment directions relative to an electrode elongation direction;
  wherein the liquid crystal layer has a retardation value $\Delta nd$ of $\lambda/2 < \Delta nd \leq \lambda$ (where $\Delta n$ is an anisotropy of a refractive index, d is the thickness of the liquid crystal layer, and $\lambda$ is a wavelength of an incident light).

19. The device according to claim 18, wherein the retardation value is about $0.74\lambda$.

20. A liquid crystal display device having a plurality of pixels each including a plurality of regions, the device comprising:
  first and second substrates;
  a liquid crystal layer having liquid crystal molecules between the first and second substrates;
  a plurality of electrodes on the first substrate in each region of the pixels, an electric field parallel to the substrates being applied to the electrodes, which is different from the electric field of a neighboring region to rotate the liquid crystal molecules in opposite directions in each neighboring region applying to the electrode in each region;
  a common bus line between at least two of the regions in at least one of the pixels, the plurality of electrodes being non-parallel and non-perpendicular to the common bus line; and
  first and second alignment layers over the first and second substrates, the first and second alignment layers providing for first and second alignment directions with respect to a longitudinal direction of the common bus line;
  wherein the first alignment direction is different from the second alignment direction.

21. The device according to claim 20, wherein the electrodes includes at least a pair of electrodes.

22. The device according to claim 21, wherein the pair of electrodes includes a data electrode and a common electrode.

23. The device according to claim 20, wherein an angle of the second alignment direction is a supplementary angle to an angle of an electrode elongation direction.

24. A liquid crystal display device having a plurality of pixels each including a plurality of regions, the device comprising:
  first and second substrates;
  a liquid crystal layer having liquid crystal molecules between the first and second substrates;
  a plurality of electrodes on the first substrate in each region of the pixels, an electric field parallel to the substrates being applied to the electrodes, which is different from the electric field of a neighboring region to rotate the liquid crystal molecules in opposite directions in each neighboring region applying to the electrode in each region;
  a common bus line between at least two of the regions in at least one of the pixels, the plurality of electrodes being non-parallel and non-perpendicular to the common bus line; and
  first and second alignment layers over the first and second substrates, the first and second alignment layers providing for first and second alignment directions with respect to a longitudinal direction of the common bus line;
  wherein the electrodes includes at least a pair of electrodes; and
  wherein the pair of electrodes have a space therebetween smaller than a thickness of the liquid crystal layer.

25. A liquid crystal display device having a plurality of pixels each including a plurality of regions, the device comprising:
  first and second substrates;
  a liquid crystal layer having liquid crystal molecules between the first and second substrates;
  a plurality of electrodes on the first substrate in each region of the pixels, an electric field parallel to the substrates being applied to the electrodes, which is different from the electric field of a neighboring region to rotate the liquid crystal molecules in opposite directions in each neighboring region applying to the electrode in each region;
  a common bus line between at least two of the regions in at least one of the pixels, the plurality of electrodes being non-parallel and non-perpendicular to the common bus line; and
  first and second alignment layers over the first and second substrates, the first and second alignment layers providing for first and second alignment directions with respect to a longitudinal direction of the common bus line;
  wherein the liquid crystal layer has a retardation value ($\Delta nd$) of $\lambda/2$ ($\Delta nd \leq \lambda$ (where $\Delta n$ is an anisotropy of a refractive index, d is the thickness of the liquid crystal layer, and $\lambda$ is a wavelength of an incident light)).

26. A liquid crystal display device, comprising:
  first and second substrates;
  a plurality of gate bus lines and data bus lines on the first substrate in a matrix form;
  a plurality of pixels defined by the gate bus lines and the data bus lines, the pixels having first and second regions;
  at least one common bus line at each pixel, the common bus line being parallel to the gate bus line and between the first and second regions;
  at least a pair of first parallel electrodes and second parallel electrodes in the first and second regions, respectively, the first and second parallel electrodes having first and second electrode elongation directions with respect to a longitudinal direction of the common bus line, the first and second electrode elongation directions being non-perpendicular to the longitudinal direction of the common bus line;
  first and second alignment layers over the first and second substrates, the first and second alignment layers having first and second alignment directions, respectively; and
  a liquid crystal layer between the first substrate and the second substrate;

wherein the electrodes in a respective pair of parallel electrodes are separated by a distance smaller than a thickness of the liquid crystal layer.

27. A liquid crystal display device having a plurality of pixels each including a plurality of regions, the device comprising:

first and second substrates;

a liquid crystal layer having liquid crystal molecules between the first and second substrates;

a plurality of electrodes on the first substrate in each region of the pixels, an electric field parallel to the substrates being applied to the electrodes, which is different from the electric field of a neighboring region to rotate the liquid crystal molecules in opposite directions in each neighboring region applying to the electrode in each region;

a common bus line between at least two of the regions in at least one of the pixels, the plurality of electrodes being non-parallel and non-perpendicular to the common bus line; and first and second alignment layers over the first and second substrates, the first and second alignment layers providing for first and second alignment directions with respect to a longitudinal direction of the common bus line;

wherein an angle of the second alignment direction is a supplementary angle to an angle of an electrode elongation direction; and wherein the liquid crystal layer has a retardation value $0.74\lambda$.

* * * * *